United States Patent
Craig

(10) Patent No.: US 7,526,074 B2
(45) Date of Patent: Apr. 28, 2009

(54) METHOD FOR NON-REAL TIME GROUP INTERACTION USING A VOICE MESSAGING SYSTEM

(76) Inventor: John N. Craig, 11104 Gainsborough Ct. apt 12, Fairfax, VA (US) 22030

( * ) Notice: Subject to any disclaimer, the term of this patent is extended or adjusted under 35 U.S.C. 154(b) by 1144 days.

(21) Appl. No.: 10/794,551

(22) Filed: Mar. 8, 2004

(65) Prior Publication Data

US 2005/0041786 A1    Feb. 24, 2005

Related U.S. Application Data

(60) Provisional application No. 60/494,129, filed on Aug. 12, 2003.

(51) Int. Cl.
*H04M 1/64* (2006.01)
*H04M 3/42* (2006.01)

(52) U.S. Cl. .................... 379/88.23; 379/202.01

(58) Field of Classification Search .......... None
See application file for complete search history.

(56) References Cited

U.S. PATENT DOCUMENTS

| | | | |
|---|---|---|---|
| 5,002,491 A * | 3/1991 | Abrahamson et al. | 434/322 |
| 5,012,219 A * | 4/1991 | Henry | 340/7.55 |
| 5,612,869 A * | 3/1997 | Letzt et al. | 705/3 |
| 5,790,637 A | 8/1998 | Johnson | |
| 5,923,733 A | 7/1999 | Binns | |
| 6,088,435 A | 7/2000 | Barber | |
| 6,253,237 B1 | 6/2001 | Story | |
| 6,288,753 B1 | 9/2001 | DeNicola | |
| 6,397,036 B1 | 5/2002 | Thean | |
| 6,442,590 B1 * | 8/2002 | Inala et al. | 709/204 |
| 6,480,885 B1 * | 11/2002 | Olivier | 709/207 |
| 6,516,340 B2 * | 2/2003 | Boys | 709/204 |
| 6,526,128 B1 | 2/2003 | Kermani | |
| 6,788,949 B1 * | 9/2004 | Bansal | 455/519 |
| 6,879,994 B1 * | 4/2005 | Matsliach et al. | 709/204 |
| 6,993,555 B2 * | 1/2006 | Kay et al. | 709/202 |
| 7,000,019 B2 * | 2/2006 | Low et al. | 709/227 |
| 7,092,821 B2 * | 8/2006 | Mizrahi et al. | 702/1 |
| 2006/0067502 A1 * | 3/2006 | Bamrah et al. | 379/211.02 |
| 2006/0115803 A1 * | 6/2006 | Kalisiak | 434/323 |
| 2007/0022169 A1 * | 1/2007 | Suzuki et al. | 709/206 |
| 2007/0220092 A1 * | 9/2007 | Heitzeberg et al. | 709/204 |

\* cited by examiner

*Primary Examiner*—Curtis Kuntz
*Assistant Examiner*—Joseph T Phan

(57) ABSTRACT

This invention provides a method for conducting a non-real time group interaction, employing a programmable voice messaging system, such as a voice message board, for storing and replaying messages from facilitators and group members. The invention provides a method for communication in rounds of discussion, whereby facilitators leave a first message and group members listen to and optionally respond to that message. The facilitators then listen to the members' responses and optionally create additional messages or optionally edit the members' messages, to guide and control the discussion. The cycle of facilitators listening, optionally responding, optionally editing followed by group members listening and optionally responding can be repeated multiple times. Also provided is a voice note pad means for users of the instant invention, whereby users can interrupt the stream of voice messages and create a new, private voice note pad message, and optionally later listen to or edit their voice note pad messages.

17 Claims, 2 Drawing Sheets

METHOD FOR NON-REAL TIME GROUP INTERACTION USING A VOICE MESSAGING SYSTEM

PRIORITY DOCUMENT

This application claims priority from U.S. Provisional Patent Application 60/494,129, filed Aug. 12, 2003.

FIELD OF THE INVENTION

The invention disclosed herein relates to the field of telecommunication systems and processes, particularly involving the administration or management of voice messaging systems for conducting group interactions, such as educational seminars or discussion groups, without real-time interactions.

BACKGROUND OF THE INVENTION

This invention relates to a voice-messaging system and method through which anyone can conduct seminars, classes, support groups, workshops, team meetings, committee meetings, prayer circles, roundtable discussions, or any other kind of group discussion, group meeting, group interaction or the like, over the telephone or similar communications unit, without real-time interactions (non-real-time). The non-real-time aspect means that the participants are not connected simultaneously to a computer, telephonic system, or each other.

The group interactions of this invention are mediated by using a programmable voice messaging system (PVMS) which provides a "voice bulletin board" or "voice message board" or the like as a forum for a group dialogue. The interaction created is similar to the interactions created on private Internet message boards. However, the dialogue is not haphazard and unstructured, as the interactions often are on Internet message boards. Rather, the dialogue is structured in carefully organized rounds or cycles of interaction that proceed according to a preset schedule.

Others have invented other ways of conducting group interactions in non-real time. For example, seminars and support groups are now conducted on line in non-real-time in at least three ways. First, seminars or support groups are conducted on special Internet message boards, typically hosted on websites, wherein group members post and retrieve messages, creating a seminar or support-group dialogue over a period of time. Second, seminars and support groups are conducted through email "listservs:" group members send an email message to an email "list server," and it automatically sends a copy of that email to the email boxes of all other group members; as other group members also submit email messages to the list server, a group dialogue is created. Third, seminar and support-group dialogues are conducted simply by using group email: a person sends an email message addressed to all the other members of a group, any of the other members of the group can click on the "reply to all" button or similar button, sending his or her further comments or questions to all other members. As the next step in the process, any one of these can later, at any time, also click on "reply to all" and continue the group dialogue in this way. Using these methods, non-real-time seminars or group interactions can be created on line over a period of days, weeks or months. Compared to the inventive method described herein, these methods generally lack structure or facilitated guidance of the interaction, and always lack the presence of human voices.

Group interactions can also be conducted on the Internet in real time with the well established art of chat rooms, such as those on AOL or MSN, or by instant messaging, such as "AOL Instant Messenger," or "MSN Messenger." Compared to the inventive method described herein, these methods generally lack structure and facilitated guidance of the interaction. They always lack the presence of human voices and non-real time aspects.

Group interactions can also be conducted in real time by telephonic communication using voice or video conferencing. Compared to the inventive method described herein, voice or video conferencing does not have the non-real time aspects.

Accordingly, it is an object of the present invention to provide a method whereby members of a group can interact at disparate times and places, and using the power of the human voice to conduct the interaction.

A further objective of the present invention is to provide facilitated discussions in non-real time, whereby the facilitator has the capability to edit voice messages on the system, by reordering, rearranging, reorganizing, combining, redirecting, or deleting specific messages left by members of the group.

A further objective of the present invention is to provide facilitated, or moderated, discussions in non-real time, whereby the facilitator's and members communicate in rounds or cycles of interaction, in which the facilitator leaves a message, members listen and optionally respond, and the facilitator listens to and optionally edits the messages on the system, by reordering, rearranging, reorganizing, combining, redirecting, or deleting specific messages. The members then listen to the messages remaining on the system and optionally respond, repeating the round or cycle of interaction.

Interactive distance learning is well established, and usually involves both synchronous and asynchronous communications. These are usually computer based. The computer-based asynchronous mode, while permitting non-real time learning, does not have the advantage of reflecting voice tone. Synchronous mode, of course, demands simultaneous participation with the consequence of lost convenience to the recipients of the information. For example, in U.S. Pat. No. 6,288,753, inventors DeNicola et al. describe a system and method for an interactive, Internet-based videoconferencing multicast operation which utilizes a video production studio with a live instructor giving lectures in real-time to multiple participating students. The videoconference multicasting permits the students to interact with the instructor and other installations during the course of the lecture. Compared to the present inventive system, DiNicola's interaction must occur in real time. All participants must be connected at the same time.

Generally speaking, the concept where a person records something at one time, to be accessed by a second person at a later time convenient to the second person, is well established. This, for example, is exemplified by the personalized time-shifted programming disclosed by Story et al. in their U.S. Pat. No. 6,253,237. The Story et al. patent teaches the retrieval of digital content from a digital library. Once retrieved, the content is stored locally, for example, on a personal computer. The locally stored content is transferred, in whole or in part, to a playback device that allows a user to listen to the content of the playback device. In one embodiment of the Story et al. invention, the user may designate portions of a playback time provided by the playback device to various selections. For example, with a playback device that provides two hours of content, a user may wish to listen to one half hour of news, one half hour of a series and one hour of a book. Thus, the user may partition one quarter of playback time to each of news and the series and one half of the playback time to the book. Content may be selectively updated in accordance with the user's desires. Compared with the present inventive system however, Story does not teach an interaction by a group in structured rounds or cycles.

In another example of Internet-based distributed lectures, the Boys disclose in U.S. Pat. No. 6,516,340 shows an Internet-enabled subscription teaching service system. The system has an Internet-connected lecture server executing a software suite, one or more teacher-author stations coupled to the Internet-connected lecture server, having input and display apparatus, and including lecture-authoring software, and one or more Internet-capable lecture client stations having lecture-participation software. Teacher-authors use the teacher-author stations to prepare lectures through the lecture-authoring software, the lecture server stores prepared lectures, and provides lectures on a pre-determined schedule to lecture clients at the lecture client stations, and the lecture clients follow the provided lectures at the lecture client stations through the lecture-participation software. Some lectures are fully automatic, and some are directed by the teacher-authors in real time. In the real time case recipients are directed to web pages in unison, and annotation and commentary is provided by the teacher-author as pages are visited. The invention herein described does not require group members or facilitators to have Internet access, though in some versions of the present invention Internet tools may be included as part of the system and any users who desire to use these tools will need Internet access. In addition, the invention herein described is not necessarily based on web technology. Further, the instant invention does not provide any real-time interactions but offers only non-real-time interactions, and provides, as a key element, tools for the leader to rearrange, reorganize, combine, recombine, redirect, reorder, or delete specific messages.

Another similar example is that in the disclosure of Johnson and Coyle, in U.S. Pat. No. 5,790,637. That patent teaches an architecture for communication among team organized users. Such teams are comprised of persons in a business environment working on projects where message sharing security must be controlled both within teams and between teams. A project, for example, would have multiple teams, such as executives, attorneys, and accountants. Individual users can be members of multiple teams, but users can only listen to messages of teams they belong to. Compared to the present invention, the Johnson and Coyle patent does not teach structured rounds of discussion between group members, supervised by a facilitator.

"Collaborative learning" also is well established as including post learning event stages where follow-up materials are prepared and presented to the users. Described, for example, by patentees Thean et al., in U.S. Pat. No. 6,397,036, is such a learning system, method and computer program product, which enables live, real time interaction between the audience and a presenter in a controlled learning environment. The Thean et al. collaborative learning system, method and computer program product afford a learning process that facilitates the transfer of expertise and knowledge using "push" technology. The system includes a presenter subsystem, a backbone subsystem and an audience subsystem. The process includes pre-event, event and post-event stages. During the pre-event stage, content is created and optimized, and a producer "coaches" the presenter. During the event stage, the presenter and the producer present the event material to a remote audience. The event materials may comprise slides, streaming audio/video and interactive answers to questions and responses to audience feedback. During the post-event stage, follow-up materials are prepared and presented to the audience, case studies are analyzed and the results are presented to the audience, and the event and related documents are archived for later retrieval. The "post-event" features notwithstanding, an essential element of "collaborative learning" is that the instructor and students are all in contact at the same time. In other words, distinguished from the present invention, the collaborative learning system lacks the non-real time aspects, and the interactions conducted in rounds.

A method for connecting a group of people unknown to each other into a live conference call for a short-lived discussion has been established. Barber et al., in U.S. Pat. No. 6,088,435, have established a way of connecting callers who call a system, and who wish to speak to others about a particular topic of interest, to be connected to each other in a live conference call, or to be connected to one or more voice messages recorded previously by others and related to the specific area of interest. However, these callers do not maintain any kind of ongoing group interaction; that is, they do not form a group that continues to interact over a period of days, weeks, or months in structured rounds of interaction, as described by the present invention. In addition, the group interaction that may be created, that is, the telephone conference call, is a live interaction. It is a real-time interaction, as are the interactions created using the present invention. In addition, a caller who is connected not into a conference call but with a group of voice messages left by other callers still does not join any organized, structured, ongoing group for an ongoing structured interaction. Rather, he or she merely hears a series of voice messages left by others who may or may not contact him or her and who may or may not ever connect with each other. By contrast, users of the present invention become involved in an ongoing, structured interaction, involving regular interaction with the same group members over a period of time, on a preset schedule.

Various methods for sending voice messages to groups of people are well established. For example, Binns et al., in their U.S. Pat. No. 5,923,733, present a method whereby one caller can call a system, record a voice message, and command the system to deliver that message to a group of individuals whose telephone numbers are stored on the system. The system calls each telephone number and, if the individual answers, delivers the voice message. If the individual does not answer but an answering machine or voice mailbox answers, the system delivers the message into the answering machine or voice mailbox. Thus a message can be broadcast to a specific group. However, this method does not have as its goal the creation of an ongoing, structured group interaction among a set of individuals. Nor does it have as its goal the creation of a seminar or support-group dialogue. Messages are not distributed or delivered on any preset schedule, or with the goal of creating rounds or cycles of group interaction.

In discussing the background of the present invention, a distinction is made between non-interactive or one-way (or broadcast) media, on the one hand, and interactive or two-way electronic media, on the other. Only by drawing this distinction will the advantages of the present invention be clear.

Television, radio, and video and audio cassettes, DVD's, CD's, and the like, are not two-way, interactive media. They provide one-way communication only. They simply present information, and typically do not allow any way for a user to communicate with the creator of that information, or other receivers of that information, other than inviting audience feedback communications, as in listener cards and letters which may or may not be transmitted for public consumption. Still, this does not normally permit an exchange between user and information creator, nor directly between users.

Audio and mixed mode (audio, video, or computer) CD's and DVD's are essentially media which allow only for one-way communication, although these media allow users to interact with the information stored on them to a limited extent. For example, users can select which information they want to see, hear, or use, at a particular moment, using a computer player. To this extent these media are interactive. But, again, these media are not interactive in the sense that they allow users to interact with the creator(s) of the information, or with other users (to ask a question, for example).

Two truly interactive media are the telephone system and Internet based text, voice, and video communications. Both of these allow for two-way communication. These media can allow users to communicate with the creator of a lecture, or communicate with each other. And in most kinds of classes or educational formats, interaction is essential not only between instructor and seminar participants (students), but among participants. Although this kind of interaction is not necessary in pure lectures, it is desirable or necessary in most classes, seminars, and the like. And back-and-forth communication among members of a support group is absolutely essential to the support-group process. The present invention allows communication among class or seminar members, and between a lecturer or instructor and seminar participants, and among group members in any kind of group discussion.

Correspondence courses, which rely on the back-and-forth mailing of paper documents, of course, have been in existence for decades. However, the present invention is different from such courses in that communication is far speedier, because the present invention is electronic and communication through it does not need to wait on postal delivery of documents. Further, postal delivery does not allow for human voice interaction, as in the present invention.

BRIEF SUMMARY OF THE INVENTION

This invention provides a method for conducting a non-real time group interaction, employing a programmable voice messaging system, such as a voice message board, for storing and replaying messages from facilitators and group members. The system provides a method for a facilitator to initiate a group interaction at a predetermined scheduled time by leaving a message for the others in the group. At a later predetermined scheduled time, group members listen to the facilitator's message and optionally respond. At a later predetermined time, the facilitator has the capability, through greater rights on the programmable voice message system, to respond to member's messages, and to edit messages by reordering, rearranging, reorganizing, combining, redirecting, or deleting specific voice messages. At a later predetermined time, the members listen to the member's messages and the facilitator's responses, and optionally respond. The steps of listening, responding, and the facilitator's management of the messages can be repeated multiple times in a listening and responding cycle. There is further provided an optional termination phase, where the facilitator's summarize the interaction, the members listen to the summary, and the interaction ends. In this manner, a facilitated discussion can be conducted whereby group members are directed or coached by the facilitators in non-real time, remote in time and space. Also provided is a simplified method using a conventional voice mail system, which can provide similar overall functionality, but with few features and certain other drawbacks compared to the more desired programmable voice message system. Also provided is a voice note pad means for users of the instant invention, whereby users can interrupt the playback of the stream of voice messages and create a new voice note pad message, and optionally edit their previously recorded voice note pad messages, and access the voice note pad messages later.

BRIEF DESCRIPTION OF THE DRAWINGS

The method of the instant invention employing a PVMS is shown in flow chart fashion in FIG. 1. The method of the instant invention employing a conventional voice mail system is shown in flow chart fashion in FIG. 2.

DETAILED DESCRIPTION OF THE INVENTION

Figure 1:
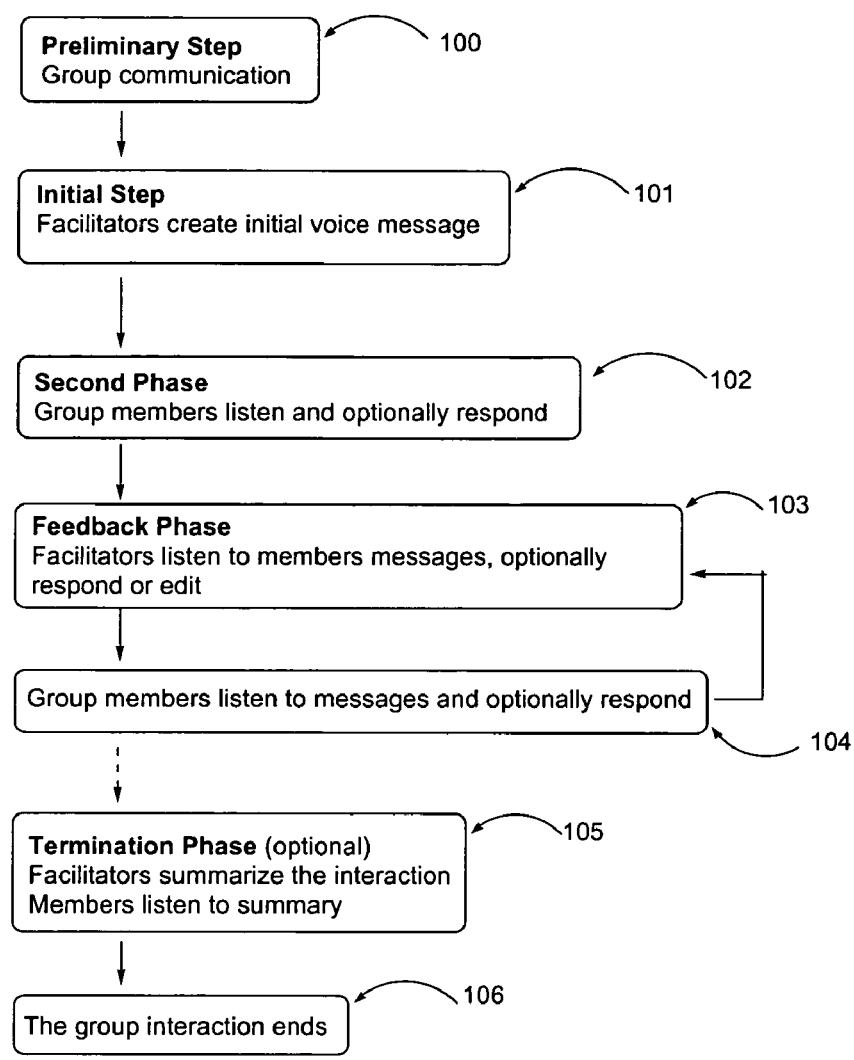

An objective of the present invention is to provide a structured, controlled, and rationally guided group interaction in non-real time employing voice communication. One reason for the use of voice communication in the invention described herein is to better convey the expressions, emotions, and feelings of one person to another, in a fashion that is difficult or impossible using text or other communication methods. Accordingly, this invention provides a method for conducting a non-real time group interaction, comprising:

a. a group of at least one facilitator and one member;

b. a programmable voice messaging system providing authentication to each individual facilitator and member;

c. an initial interaction phase wherein the facilitator provides a voice message addressed to the group members at a first predetermined scheduled time;

d. a second interaction phase where the members access and listen to the facilitator's voice message at a second predetermined scheduled time, and the members optionally respond to the facilitator's voice message by providing a voice message addressed to the facilitator or the entire group or both;

e. a feedback loop interaction phase, wherein
  i. at a third predetermined scheduled time, the facilitator accesses and listens to the messages left by the group members, and optionally responds and provides feedback on the voice messaging system to the group as a whole, to one or more individual members, or to one or more specific messages, or to any combination thereof, and
  ii. the facilitator has the capability to optionally edit specific voice messages, and
  iii. at a fourth predetermined scheduled time, each group member accesses the voice message system and listens to the messages left by the others in the group or by the facilitator or both, all optionally edited by the facilitator, and
  iv. the facilitator and members optionally repeat the feedback loop, wherein the members respond to the set of messages left at the fourth predetermined time, and wherein the events at the third and fourth predetermined scheduled times are repeated;

f. an optional termination phase, wherein
  i. at a fifth predetermined scheduled time, the facilitator summarizes the contents of the voice messages of the group and facilitator's provided during the loop interaction phase, by leaving summary voice messages for the group, and
  ii. at a sixth predetermined scheduled time the group members listen to the summary voice messages, and
  iii. at a seventh predetermined scheduled time, the group interaction ends.

A programmable voice message storage system (PVMS) is required to enable the voice message board, authentication, and computer controlled features of this invention. A simple telephone answering machine or conventional voice mail type of system will not suffice for the instant invention. The programmable voice message system suitable for this invention must have the following features:

Voice message board features, meaning that members and facilitators can access the PVMS, and create, listen to, and edit messages as their authentication rights allow.

Authentication, meaning that each user is authorized to access the system and method, using some sort of log-in name and password, which methods are well known in the art of computer and voice messaging systems. The authentication of the instant method controls the user rights available on the system. Group members and facilitators would have the right to listen to and create voice messages, and other rights. The facilitators would have greater rights on the system, including the right to enable them to reorder, rearrange, reorganize, combine, redirect, or delete any specific voice message.

Editing features. In order for the facilitators to guide the group interaction that is occurring remotely in time and space in the method described herein, the facilitators require the ability to optionally reorder, rearrange, reorganize, combine, redirect, or delete specific voice messages. These types of features are not available on simple telephone answering machine or conventional voice mail systems. However, programmable voice handling systems are known in the art that can be employed to provide these features. Two examples of commercially available voice application development systems are "Voice C++/ActiveX Software Development Toolkit" from Blackice software (www.blackice.com), and "VBVoice 5.1," from Pronexus software (www.pronexus.com). These applications run on conventional computers, using operating systems such as Windows or Linux, and employ telephony cards.

One of these types of voice application development systems, such as those mentioned in the foregoing paragraph, will have to be programmed on a suitable computer system for use in the instant invention. The system of the present invention will require commands that the programmable system will have to implement for the users of the system. For example, one such command will be to listen to the currently available messages. Another command will be required for users to create a new message. Another set of commands will be required for the facilitators to edit, rearrange, reorganize, combine, recombine, redirect, reorder, or delete specific voice messages.

The commands on the PVMS of this invention may be voice activated. For example, the programmable system could be arranged so that the system would prompt users to leave a message, by having a system controlled voice say "say 'create' to create a new message." The PVMS would then implement the feature of allowing a user to record a message. Alternatively, the commands could be based on the telephone keypad, so for example, the system could say "press the number one to create a new message." In a similar fashion, optionally using nested menus, all the required system commands would be implemented.

Additionally, it is contemplated that the facilitators could access the system via a computer console that would transmit visual information on a text screen, such as which members have left new messages, and at what date and time, and the length of the message. One such embodiment of a text screen would be a web page. Another embodiment would be textual information transmitted via WAP to a browser in a wireless device. The textual information would also be used to control the editing features of this invention. For example, after listening to a message from a particular user, the facilitator may decide to delete that message, and a pointing device would be used to highlight and delete the message to be deleted. However, the basic listening function of the facilitators would require telephonic means.

A further objective of the method described herein is to provide a computer based interaction method that does not require the users to have immediate physical access to a computer or Internet provider. The method of the instant invention is fully accessible to anyone with a telephone. Because of the ubiquity of telephones, users can access this method with great schedule and physical location flexibility. Users could access the system from their home or office using a conventional telephone. Many people have cellular or wireless telephones that could work very well in this method in a car, on the beach, or some other place away from the home or office.

Groups that could find this invention useful might be support groups for medical or psychological conditions, groups for personal development or an educational purpose, or business groups working on a commercial project. Examples of support groups for medical conditions are groups for obese people trying to lose weight, cancer victims dealing with a life threatening illness, or HIV positive people trying to live a normal life. Examples of psychological groups are survivors of child abuse, people working through divorce, or people working through some other personal crisis. Examples of personal development groups are groups whose purpose is lifestyle issues, such as men's sexuality, improving personal relationships, or groups discussing political issues like current national affairs. An example of a business group might be product development teams where individual members in different geographic locations and with different work functions are collaborating, for example, computer programmers in one city and mechanical fabricators in another city. In such an example, the team leader would be the facilitator. The foregoing examples are not meant to be limiting in any way, but merely illustrative of the types of groups that might find the inventive method useful.

A group, as defined herein, has at least two classes of participants: facilitators and members. Facilitators lead, guide, moderate, and control the discussion. In the case of groups dealing with a pathological condition, the facilitators may be professionally trained, such as licensed psychotherapists or medical doctors. A group, as defined herein, must have at least one facilitator, and may have more than one facilitator. For example, a group may be led by a team of two or more facilitators. The group members are the persons hoping to achieve some benefit from their participation in the group. In addition, the instant invention contemplates a third class of participants that may optionally be permitted. This third class would be purely passive, and would only listen and have no capability to create messages or actively participate in the discussion. Such passive members might be implemented for quality control purposes, to monitor the discussion and provide criticism on the technique of members or facilitators. Alternatively, such passive members may be trial members who want to sample the discussion before fully participating at a later time, or individuals whose only desire or need is to be passive listen-only members. Unless otherwise stated hereafter, the term "members" refers to active members as described in this paragraph.

In terms of group size, as contemplated herein, a group would have at least one facilitator and at least one member. While there is no absolute upper limit on the number of members, it is generally expected that this method will be of value with groups up to about 20 members. Thus, in an embodiment of this invention, the number of members is between 1 and 20 people. In a preferred embodiment, the number of members is between 2 and 15 people. In yet another embodiment, the number of members is between 3 and 10 people.

In addition, although the groups described above might have no passive members, they might have one or more passive members. While there is no absolute upper limit on the number of passive members, in an embodiment of this invention the number of passive members is between 1 and 20 people. In another embodiment, the number of passive members is between 10 and 100 people. In another embodiment, the number of passive members is between 100 and 5,000 people. In yet another embodiment, in which the audio content of the voice messages is made public via radio broadcast, the number of passive members is between 5,000 and 50,000.

The overall flow of the sequence of events of the present invention is as shown in the flow chart of FIG. 1.

A preliminary interaction, depicted in FIG. 1 as step 100, must take place that involves establishment of the group, creation of accounts, and communication of the schedule of events, to be described more fully below. Further, at this stage housekeeping functions can be established such as information to the members on the system commands.

In the initial interaction phase, depicted in FIG. 1 as 101, the facilitator leaves an initial message for the group to start the interaction. Note that the singular term "facilitator" is generally used herein, but there may be more than one individual facilitator for a given group, in which case the plural "facilitators" should be substituted. For example, a group may be led by a team of two or more facilitators. The initial message would be created at a predetermined scheduled time. Such a message could be of any length. In an embodiment of this invention, the initial message length is between five seconds and one hour in duration. In another embodiment of this invention, the initial message length is between five minutes and thirty minutes in duration. In yet another embodiment of this invention, the initial message length is between ten and twenty minutes in duration. The initial message might comprise a welcome message, introductory remarks about practical matters, and a substantive message, which might be in the form of a lecture, extemporaneous or prepared in advance, and may also be in the form of pre-recorded information taken, for instance, from a collection of the facilitator's instructive works.

As used in this invention, the term "predetermined scheduled time" means a window of time that is communicated in advance to all members of the group. The predetermined scheduled time would have some flexibility built in, and the window of time might, for example, be a 12 to 24 hour window. For example, the window of time for members to listen to the initial message may commence at noon on one day and continue to 8 AM the following morning.

In the second interaction phase, depicted in FIG. 1 as 102, at a predetermined scheduled time, the members would call the voice message system and listen to the initial message. Using system commands, the members would then have the ability to respond to the initial message and leave a member's message for others in the group. By the term "respond," as used herein, it is meant that a message is created responsive to a previous message on the system. Such a response message could be a question, comment, observation, opinion, description of personal experiences, etc. Such a member's message could be of any length, or could be limited in duration by the programmable voice message system. In one embodiment of this invention, the member's message length is between five seconds and thirty minutes in duration. In another embodiment of this invention, the member's message length is between two minutes and fifteen minutes in duration. In yet another embodiment of this invention, the member's message length is between three minutes and ten minutes in duration. It is contemplated that the programmable voice message system will impose a limit in message duration that depends on factors determined by the facilitator, such as the number of people in the group and the nature of the subject matter of the group. It is further contemplated that if such a time limit is imposed, that the programmable voice message system will provide a warning that the time limit is approaching.

The members' messages created in this second interaction phase would generally not be available to other members to listen to during this second interaction phase, as the messages would be in an unmoderated discussion. A key element of the present invention is that the discussion is moderated and controlled by the facilitator, so the facilitator will generally listen to and edit member's messages before other members listen to member's messages.

The next stage is the feedback loop interaction stage, depicted in FIG. 1 as 103 and 104. In this stage, at a third predetermined scheduled time, the facilitator would listen to and optionally edit specific voice messages on the PVMS, by reordering, rearranging, reorganizing, combining, redirecting, or deleting specific voice messages, at a predetermined scheduled time (103). In addition to the editing operations described in this paragraph, in the feedback stage the facilitator may elect to create voice message remarks to guide the discussion. Such remarks could be directed to the group as a whole, or to one or more specific individuals privately, or by any combination thereof. The duration of the facilitator's additional or follow up messages would be similar to the previously noted duration for initial messages. By the foregoing editing and message creation operations, the facilitator would be able to direct the discussion in a guided, rational fashion.

The members would then, at a fourth predetermined scheduled time (104), listen to the messages on the system as edited by the facilitator. While listening to any of these messages, the member could rewind, fast forward, skip messages, or pause the playing of messages. The members may then optionally have the capability to leave additional or follow-up messages for the group. The duration of the members' remarks would be similar to the previously noted duration for members' messages.

The facilitator would then, at a predetermined scheduled time, listen to the foregoing messages, as in 103, and edit them as described previously, by reordering, rearranging, reorganizing, combining, redirecting, or deleting specific voice messages, and optionally creating new messages to guide the discussion, as occurs at the beginning of the feedback loop stage. In this fashion, the feedback loop stage is optionally repeated. The discussion at the heart of the method therefore occurs in a cyclic fashion, or by rounds of communication. Depending on the group, this could be continued one or more times, or indefinitely, or over an extended but limited period, such as weeks or months.

As an optional step, the interaction is terminated in a termination phase, depicted in FIG. 1 as 105, wherein the facilitator, at a fifth predetermined scheduled time, listens to the last round of interaction in the feedback loop stage, and optionally edits the voice messages on the PVMS, by reordering, rearranging, reorganizing, combining, redirecting, or deleting specific voice messages, and optionally creating a summary remarks voice message for the group. The duration of the facilitator's summary remarks would be similar to the previously noted duration for initial messages. The group members would then, at a predetermined scheduled time, listen to the summary remarks. The VMS of the instant invention as described herein would then be turned off at a seventh predetermined time. This would terminate the entire interaction of this invention (106).

CVMS Method

An alternative embodiment of this invention employs a conventional voice mail system (CVMS). This embodiment does not provide a PVMS which has full flexibility regarding features such as reordering, rearranging, reorganizing, combining, redirecting, or deleting specific messages left by group members. Rather, this version of this process would provide facilitators only with a certain specific way of editing and reordering messages, using only commands typically found on a CVMS, and may not provide the security and control features that a PVMS would provide.

This embodiment provides a method for conducting a non-real time group interaction comprising:
 a. a group of at least one facilitator and one member;
 b. a voice messaging system with a communal voice mail account, and personal voice mail accounts for each individual member;
 c. an initial interaction phase wherein at a first predetermined scheduled time the facilitator provides a voice message forwarded to each personal voice mail account;
 d. a second interaction phase, wherein
  i. at a second predetermined scheduled time the members access their personal voice mail account and listen to the facilitator's voice message, and
  ii. the members optionally respond to the facilitators voice message by accessing the communal voice mail account and leaving a voice message;
 e. a feedback loop interaction phase, wherein
  i. at a third predetermined scheduled time, the facilitator optionally creates an Introductory Message and forwards this message to the personal voice mail account of each member;
  ii. the facilitator then accesses the communal voice mail account and listens to each message left by the group members, and for each message, the facilitator forwards that message to each member, and then optionally responds and provides feedback to each individual message on the communal voice mail account, and then forwards each response to each member, and
  iii. the facilitator optionally creates a concluding message and forwards this message to each member, and
  iv. at a fourth predetermined scheduled time, each group member accesses their personal voice mail account and listens to the set of messages forwarded by the facilitator, and
  v. the facilitator and members optionally repeat the feedback loop, wherein the members then access the communal voice mail box and leave a new message, and wherein the facilitator and members repeat the feedback loop with the events at the third and fourth predetermined scheduled times;
 f. an optional termination phase, wherein
  i. at a fifth predetermined scheduled time, the facilitator creates summary remarks and distributes them to the personal voice mail accounts for each member, and
  ii. at a sixth predetermined scheduled time the group members listen to the summary voice message, and
  iii. at a seventh predetermined scheduled time, the group interaction ends.

This second embodiment employs a voice mail system (VMS), which can be a CVMS. The VMS is created with a communal voice mail (VM) account, and personal accounts for each facilitator and member. A key component of this embodiment of the instant invention is that the facilitators create a distribution list of the personal accounts of each member. A distribution list functionality is a typical feature of a CVMS. This distribution list will be used in the forwarding operations of the method.

Figure 2:
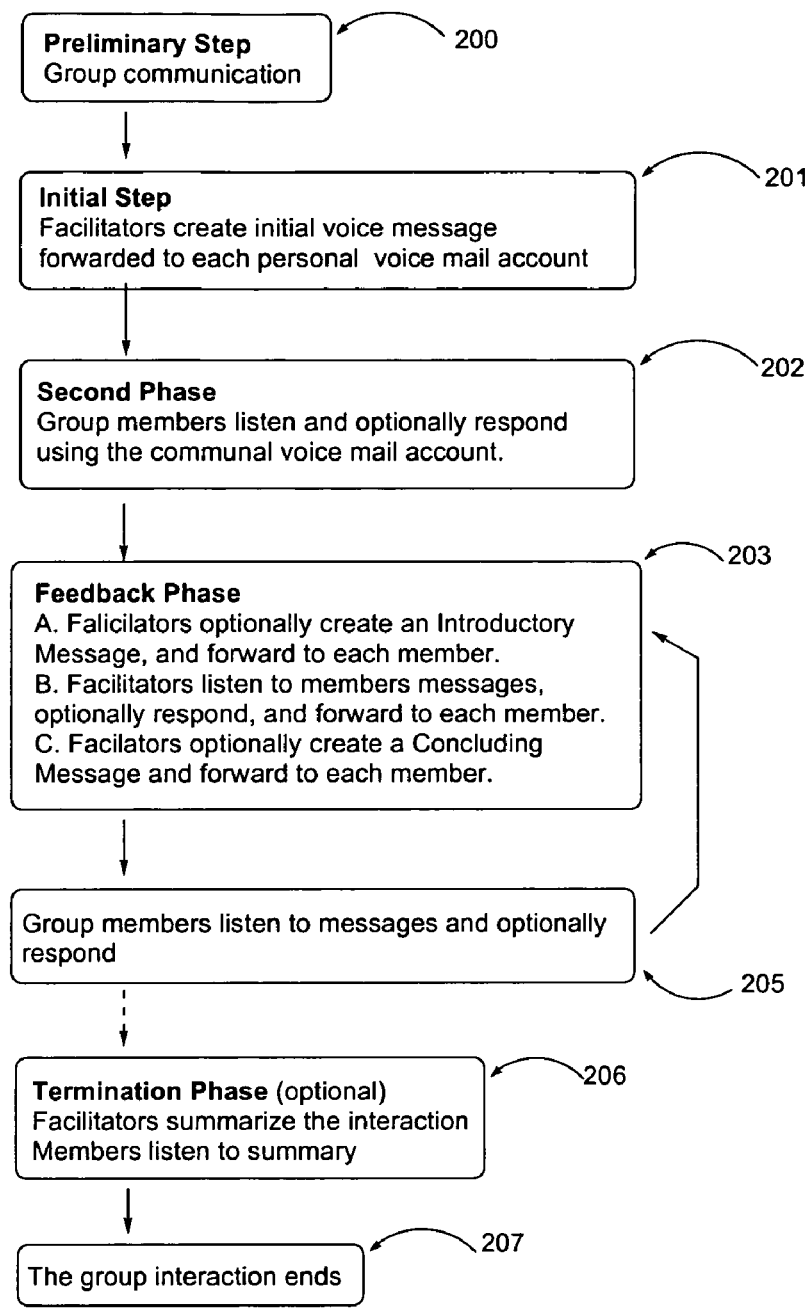

Referring to FIG. 2, which illustrates the operation of this embodiment in flowchart fashion, there is a preliminary communication step (200), wherein essential housekeeping functions are performed, such as establishment of the group, registration of the facilitators and members, creation of accounts, communication of the schedule of predetermined times, and communication of the system commands. Also at this stage, the facilitator needs to create a distribution list of the personal accounts of each member. Note that the singular term "facilitator" is generally used herein, but there may be more than one individual facilitator for a given group, in which case the plural "facilitators" should be substituted. For example, a group may be led by a team of two or more facilitators.

In the initial step (201), at a first predetermined time, the facilitator creates an initial voice message that is forwarded to each individual personal voice mail account via the distribution list. This initial message starts the group interaction, and might comprise a welcome message, introductory remarks about practical matters, and a substantive message, which might be in the form of a lecture, extemporaneous or prepared in advance, and may also be in the form of pre-recorded information taken, for instance, from a collection of the facilitator's instructive works.

In the second phase (202), at a second predetermined time, each member accesses their personal voice mail account and listens to the facilitator's initial voice message. The individual members then optionally access the communal voice mail account and respond to the initial message by leave a question or comment message in the communal voice mail account. Such a response message could be a question, comment, observation, opinion, description of personal experiences, etc. The intent at this stage is that the members would not listen to the messages of others. Note that in the communal voice mail account, members would have privileges to leave messages only, not to listen to messages. Only the facilitator would have access to communal voice mail account to listen to, forward, or delete messages. In other words, the facilitator would "own" the communal account. The members would only use the communal account as they would any other person's voice mail account that they can call and leave a message thereon, but not be able to listen to the messages.

In the feedback loop interaction phase (203), at a third predetermined time, the facilitator accesses the communal voice mail account and listens to each individual message, and optionally creates an "Introductory Message" and forwards it to the distribution list. The Introductory Message at this stage serves as introductory material to the list of messages that will be assembled as described as follows, that will follow the Introductory Message. The facilitators then listen to each message left by the members in the communal voice mail account. For each message, the facilitators perform the following operations: (a) each message is forwarded to the distribution list; and (b) the facilitators optionally create a message responding to the members message and forward the response message to the distribution list. Following this repetitive operation, and after listening to, forwarding, and optionally responding to each members message, the facilitators may optionally create a "Concluding Message" summarizing this round of the interaction, which will be forwarded to the distribution list. In this fashion, the set of messages on each personal voicemail account will comprise, in order, the optional Introductory Message; the first members message; the optional facilitators response to the first members message; the second members message, the optional facilitators response the second members message; and so on, for each members message and optional facilitators response, and finally the optional Concluding Message.

At a fourth predetermined scheduled time (205), the group members access their personal voice mail accounts and listen to the entire set of messages. Optionally, the communal voice mail account would be made available so that members can leave a new response message, as the members did previously at the second predetermined time. If this option were made available, the feedback loop would be repeated, with all the elements at the third and fourth predetermined times repeated one or more times on a predetermined schedule. The discussion at the heart of the method therefore occurs in a cyclic fashion, or by rounds of communication. Depending on the group, this could be continued one or more times, or indefinitely, or over an extended but limited period, such as weeks or months.

Optionally, there could be a termination phase at a fifth predetermined time (206), wherein the facilitator creates a summary message and forwards it to the distribution list. At a sixth predetermined time, the members would listen to the summary message, and at a seventh predetermined time, the VMS of the instant invention as described herein would then be turned off and the group interaction would terminate (207).

This embodiment of this process does not allow as much flexibility as a PVMS for reordering, rearranging, reorganizing, combining, redirecting, or deleting specific messages left by group members. However, it makes easy a very common form of group interaction: the lecture or presentation followed by a question-and-answer session. Its advantage is that it uses a conventional, readily available CVMS with the well known interfaces and standard commands that are common to a CVMS.

Voice Note Pad Method

An additional objective of the instant invention is to provide a voice note pad method, which can be used in conjunction with the non-real time interaction method, to allow participants to interrupt a session of the non-real time interaction method and record personal messages. Such messages might reflect private thoughts that the participant may listen to later and never redirect to others. Alternatively, such voice note pad messages might reflect private thoughts or fragments of thoughts that may be combined or elaborated later into a more complete response that might be directed to one or more other participants. Accordingly, there is provided a voice note pad method for users of the non-real time group interaction system, comprising:

a. a programmable voice messaging system wherein users of the system listen to a stream of voice messages;

b. a command for the programmable voice messaging system that enables users to stop the stream of voice messages, and create a new voice note pad message; and c. optionally a command to enable users to stop the recording of the note pad message and resume listening to the stream of voice messages; and d. optionally one or more commands to enable users to edit a voice note pad message, by reordering, rearranging, reorganizing, combining, redirecting, recalling, listening to, adding to, deleting, or transmitting to others one or more voice note pad messages.

Therefore, the PVMS would provide a system command that could be entered at any time during the playing of messages in the non-real time interaction method, to interrupt, stop, or pause the playing of the current messages. The user of this invention would then have the ability to record a new voice note pad message. Optionally, the user could resume playing the messages in the non-real time interaction method. Finally, the user would have commands to optionally edit a voice note pad message, by reordering, rearranging, reorganizing, combining, redirecting, recalling, listening to, adding to, deleting, or transmitting to others to others one or more voice note pad messages. By transmitting to others is meant sending a voice note pad message to other members of the group through the PVMS.

An objective of the present invention is to provide communication which delivers or embodies the full sound, texture, and emotional expressiveness of the human voice (which is lost in email, fax, and paper-mail interactions). Emotional expressiveness is often important in group communications, especially in certain forms of group communication. In support groups, for example, the way a person says something may communicate information in such a way, for example by manner or tone, that is more important than what that person says. For example, a person's voice may be trembling with fear, and this emotional state is difficult to convey by email, fax, or by another writing method, but would be much more evident in the voice-messaging format used in the present invention. Emotional expressiveness can also be of key importance in business discussions. For example, a salesman may want to detect whether a customer or group of customers is eager to buy, or irritated about the way negotiations are going. The sound of their voices could reflect mood or attitude and thus reveal invaluable clues.

A further objective of the present invention is to provide ease of participation and scheduling, which can make participation in a voice-based seminar or group interaction possible even for those with unpredictable, inflexible, or overloaded schedules. Business executives, for example, have greater needs to communicate but less time for that communication. As another example, single parents, who must not only take care of children but hold down a job, have much less time than the typical non-working spouse of the past. The present invention makes it easier for these busy individuals to be involved in seminars, classes, support groups, or other group discussions.

A further objective of the present invention is to provide access to seminars and to group interactions for those isolated or widely-scattered geographically—for example, those living in outlying suburbs or rural areas. Travel time and expense can be prohibitive for many individuals who can benefit from the types of interactions disclosed by this invention. In addition, our highly mobile society means that people move often, putting great geographical distances between them and their former groups of friends or associates. The use of the present invention makes traveling to a group meeting or seminar unnecessary.

A further objective of the present invention is to provide access to seminars and group interactions for individuals with limited mobility, such as the elderly, the disabled, the bedridden, those who are ill, children, or adolescents too young to drive. Moreover, the present invention provides a less intimidating environment for those reluctant to discuss sensitive or difficult issues in a face-to-face group (for example, racism, sexuality, alcohol and drug use, or marital problems). Further, the present invention provides anonymous participation in group discussions for those especially concerned with privacy (users can use first names only, or nicknames).

A further objective of the present invention is to provide access to seminars or group discussions on highly-specialized topics. Groups discussing such subject matter might not be available locally even in large cities.

A further objective of the present invention is to provide time-flexible participation: within limits, users can schedule their participation in a seminar or group discussion at times convenient to them within the schedule windows as mentioned previously. The present invention allows users time for reflection: users can think about or contemplate the discussion before answering questions asked by others in their group or class, or before making comments about opinions others have expressed. The present invention also gives users control over the communication process. For example, users can listen repeatedly to crucial parts of any other participant's message by "rewinding" it and playing it again; they can pause the playback of comments by the facilitator or fellow group members, to reflect on these comments before continuing; or they can fast forward or skip ahead, to skip over parts of messages they do not need to hear or have no interest in. Participants do not have this kind of control over the communications process when involved in a live conference call.

A further objective of the present invention is to provide participation through a "hands-free, eyes-free" medium, the human voice: users can listen to the latest round of messages from the facilitator and other group members through inexpensive speaker phones, or through inexpensive headsets (headphones for telephones), allowing them to be involved in other activities while they listen (for example, driving, fixing dinner, or using an exercise machine)—thus boosting their personal or professional productivity. The present invention provides a way to participate in a class, seminar, support group, or other group interaction while driving a car, and thus to constructively use time often wasted in the average American's schedule (this is a major advantage of the hands-free, eyes-free medium of voice).

A further objective of the present invention is to provide a way for faster participation in an electronic group, because most people (speaking at a normal pace) talk faster than they can type. The present invention also provides a way for easier, more natural participation in an electronic group, because most people find talking easier and more natural than typing.

Other objects, features, and characteristics of the present invention will become apparent upon consideration of the following the example and the full description and the appended claims.

DEFINITIONS

Programmable voice message system (PVMS): A computerized system created with a voice application development software, such as "Voice C++/ActiveX Software Development Toolkit" from Blackice software (www.blackice.com), or "VBVoice 5.1," from Pronexus software (www.pronexus.com). Such a computerized system is programmable, and must have the ability to record and store voice messages, create system commands for functions such as creating and editing voice messages, and would provide suitable system prompts for users. The PVMS is accessible to group participants either by telephone only, or by computer with audio playing and recording means, or by a combination thereof.

Conventional voice mail system (CVMS): a conventional voice mail (or messaging) system, that can be used in certain embodiments of this invention, which is commercially available and used without modification of normal features typically available on such commercially available systems.

VMS: Voice mail system. As used in this context, a VMS refers to a system constructed from a PVMS or a CVMS, with all the attendant accounts and features necessary for the operation of the instant inventions.

Command or system command: A command entered by means of spoken voice and voice recognition software, or by touching one or more keys on a standard telephone keypad, that instructs the PVMS to perform some function, such as create a new message or delete a message.

Authentication: The method of assigning system rights to each participant. Each person in the group is assigned in advance a log-in name or password or both, and theses credentials are termed "authentication," and are used by the programmable voice message system to permit the person access to the system, and control the access rights of each person. A facilitator would have the capability to listen to and create new messages, and to edit, rearrange, reorganize, combine, recombine, redirect, reorder, or delete specific voice messages. A member would have the ability to listen to or create a new message on the system. Listen only members would only have the ability to listen to messages, not create a new message.

Group: A set of individuals comprising at least one facilitator and one member, with a common interest that for discussion.

Facilitator: Any person designated to lead or facilitate the group, who may alternatively be called moderator, instructor, teacher, group leader, group facilitator, group counselor, etc. A facilitator may be professionally trained, such as a licensed psychotherapist or medical doctor, or have some other specialized training relevant to the objective or common interest of the group, such as expertise in a certain area of business. A group, as defined herein, must have at least one facilitator, and may have more than one facilitator. For example, a group may be led by a team of two or more facilitators.

Member: Any participant in the group who is not a designated facilitator or leader. Unless otherwise noted herein, the term "member" refers to active members, who have full discussion rights, meaning that member can listen to the discussion and respond and leave messages for others in the group. Also contemplated in the instant invention are passive members, who have listen only rights and are not allowed to respond or leave messages for others.

Voice message: Any audio message, almost always recorded digitally, that is left on the system and can be of virtually any length, but usually more than two or three seconds in length and usually less than an hour in length.

Predetermined scheduled time, or predetermined time: a window of time communicated in advance for members and facilitators to perform a function. For example, a predetermined scheduled time might begin at 4 PM and continue until 11 PM of the same day, for members to listen and respond to current messages on the system.

Edit: The deletion of portions of a voice message, or the rearrangement of segments of any voice message, or the rearrangement of whole voice messages.

Rearrange, reorganize, or reorder: To place into a different sequential order, so that, for example, a message that was the second message on the system could be made the eleventh message on the system, etc.

Combine: To merge one or more messages or fragments thereof into a single, new message.

Recombine: To merge one or more messages or fragments thereof previously combined into a new message.

Redirect: To forward a message to a new destination, or to change the intended destination of a message to a new and different destination. For example, a facilitator, after hearing a message left on the system and intended for public sharing, could decide to redirect the message to another group member and not include it with messages that the facilitator decides to make public.

Delete: To remove or erase a message or part of a message.

Public: Made available to all the users of the system enrolled in this particular group discussion, seminar, class, etc.

Private: Made available to one or more individual members exclusive of the entire group.

EXAMPLES

The following examples are only illustrative of this invention, and are not meant to be limiting in any way.

Example 1

This example describes a group interaction using a PVMS involving two rounds of interaction over a period of eight days.

Preliminary Work

As a preliminary step a group would have to be in communication by mail, telephone, website, personal contact, or the like, to have the group interaction schedule, authentication codes provided, and member and facilitator accounts established.

Monday

In the first step in this method, the initial interaction phase, the facilitator engages the voice message system by calling the system, and entering his or her facilitator's authentication code. Next, the facilitator would provide a voice message for the group, which in the initial step may include a welcome message, introductory remarks about practical matters, and a substantive message, which might be in the form of a lecture, extemporaneous or prepared in advance, and may also be in the form of pre-recorded information taken, for instance, from a collection of the facilitator's instructive works. If group members called on Monday, they would be denied access and reminded that this is not a day during which any active participation is required of them.

Tuesday

In the next step of the method, the second interaction phase, members would call the voice message system during the predetermined scheduled time on Tuesday, which might be between the hours of 12:00 PM and 8:00 AM the following day. The members connect with the system by entering their individual access code, and listen to the message left by the facilitator on Monday. Members engaged through the inventive system would have the capacity or facility to "rewind" (back up) or "fast forward," or pause, as they listened, by inputting preset command signals at appropriate times during a listening session.

After the lecture was finished playing, as the next step in the process they could issue a command that would allow them to optionally record a message for this round of discussion. Such a message might be in the form of a comment, question, opinion, or a description of personal experiences. By means of commands, the message could be addressed privately to the facilitator, or designated as a message intended to be heard publicly by the group. Usually, the message would be designated as a message intended to be heard publicly by the group. Other group members will be able to listen and respond to the public messages on Thursday or subsequent days.

Wednesday

As the next step of the process, the feedback loop phase, the facilitator calls the system and enters the facilitator's authentication code. Through voice or computer means, the facilitator listens to any private messages left for him or her by the members, and to any messages left for him or her by the members and designated as messages intended to be heard publicly. By means of system editing privileges available only to the facilitator, the facilitator would have the capability to edit specific voice messages, by reordering, rearranging, reorganizing, combining, redirecting, or deleting of any specific messages. The facilitator can respond to specific messages, such as questions, either publicly to the entire group or privately to a limited subset of the group. Usually, the facilitator will respond publicly to the entire group. In this manner, the facilitator can direct the discussion in a guided, rational fashion.

Thursday

The next step in the process continues the feedback loop interaction phase. On this day all members would call in during the predetermined scheduled time, which might be between the hours of 12:00 PM and 8:00 AM the following day, and enter their authentication code, and issue a command to listen to all the public messages now on the group interaction system. While listening to any of these messages, the member could rewind, fast forward, skip messages, or pause the playing of messages.

After listening to all the messages in the system, as the next step of the process, the member would have the chance to optionally issue a command to allow the member to record a new or follow-up question or comment for this round of interaction.

At this point, the group interaction could either terminate or continue. For this example, one additional round of interaction will be described, followed by a termination phase of interaction.

Friday

On this day, a second round of group interaction begins, repeating the feedback loop interaction phase. All the events described on Wednesday are repeated on Friday.

Saturday

On this day, the second round of group interaction continues. All the events described on Thursday are repeated on Saturday.

Sunday

On this day, the termination phase of the inventive method takes place. The facilitator calls the system and enters his or her facilitator's authentication code, and through voice or computer means, the facilitator listens to any private messages left for him or her by the members, and the public messages left on the system. The facilitator then leaves a summary message of any length for the group members. Optionally, the facilitator can edit messages on the system by reordering, rearranging, reorganizing, combining, redirecting, or deleting of any specific voice message on the system remaining on the system.

Monday

On this day the termination continues. All members would call in during the predetermined scheduled time, and issue a command to listen to the summary message, and optionally other messages remaining on the group interaction system. At this point, the group interaction would end, and the PVMS would be turned off.

Example 2

In another example of a specific application of this invention, a group interaction could be conducted in the same order of events as in Example 1, but in as short a time as a few minutes, for example, in five or ten minutes, or in twenty or thirty minutes, or in forty or sixty minutes. Such a "rapid-fire" group interaction or "fast-paced" group interaction might, for example, be useful for participants who want to have a quick group discussion in response to a radio or television broadcast, or a broadcast program delivered over the Internet.

Example 3

In another example of a specific application of this invention, a version of this method uses a CVMS. This Example will illustrate this method without a repeat of the feedback loop phase, and with a termination phase.

In a group conducted with this version of this method, a VMS would be established for a discussion group with a facilitator and several members, with personal voice mail accounts for the facilitator and each member, and a communal voice mail account owned by the facilitator. Also, a distribution list of all the personal accounts will be created for the facilitator. The facilitator would call the system on a Monday and record an "Initial Message," comprising a lecture or other presentation, and the facilitator will forward the Initial Message to the personal voice mail accounts of each group member using the distribution list.

The group members will then call the system on a Tuesday, listen to the Initial Message, and then each member would access the communal voice mail account, and record a "Question Message," in which they would record a message to the group, comprising observations related to the lecture or posing a question related to the lecture.

On Wednesday the facilitator will call the system and listen to the Question Messages in the communal account. With the background of Question Messages in his or her mind, the facilitator then creates an "Introductory Message," general remarks directed at the entire group, that is forwarded to the distribution list of each members personal account. The facilitator then listens again to each Question Message on the communal voice mail account. After listening to each Question Message, the facilitator will forward that message to the distribution list, and record an "Answer Message" to that Question Message and forward the Answer Message to the distribution list. The facilitator would then listen to the next Question Message and repeat this same process, and repeat the process until every Question Message had a responsive Answer Message placed after it. The facilitator would then record a "Concluding Message," in which the facilitator would make general concluding remarks about the foregoing interaction of Introductory, Question, and Answer messages. The facilitator forwards the Concluding Message to the distribution list. In this fashion, the set of messages on each personal voicemail account will comprise, in order, the optional Introductory Message; the first Question Message; the Answer Message to first Question message; the second Question Message, the second Answer Message; and so on, for each Question and Answer Message, and finally the optional Concluding Message.

On Thursday, the participants would access their personal voice mail accounts, and listen to the set of message just described. Because in this example there is no feedback loop, the Concluding Message left by the facilitator on Wednesday also serves a summary message, and the VMS would be turned off on Friday, ending the group interaction.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. It is intended, therefore, that the invention be defined by the scope of the claims which follow and that such claims be interpreted as broadly as is reasonable.

The invention claimed is:

1. A method for conducting a non-real time telephonic group interaction comprising:
   a. a group of a facilitator and a plurality of members;
   b. a programmable voice messaging system providing authentication to each facilitator and member;
   c. first interaction phase wherein the facilitators provides a first voice message on the voice messaging system addressed to the group members at a first predetermined time;
   d. a second interaction phase wherein the members access the voice messaging system and listen to the first voice message at a second predetermined time, and the members optionally respond to the first voice message by providing a responsive voice message addressed to the group;
   e. a feedback loop interaction phase, wherein
      i. at a third predetermined time, the facilitators accesses the voice message system and listens to all responsive voice messages, and responds with a third voice messages addressed to the group members, and
      ii. at a fourth predetermined time, each group member accesses the voice message system and listens to the third message; and
      iii. the facilitator and members optionally repeat the feedback loop interaction phase, wherein any member may optionally respond at the fourth predetermined time to the third message, with a new responsive message addressed to the group, and the events at the third and fourth predetermined times are repeated; and
   f. a termination phase, wherein at a predetermined time, the group interaction ends.

2. The method of claim 1, wherein the facilitator can optionally edit messages on the voice messaging system, wherein said editing comprises reordering, rearranging, reorganizing, combining, redirecting, or deleting all or part of any specific voice message on the system.

3. The method of claim 1, wherein the feedback loop interaction phase is repeated one or more times.

4. The method of claim 1, wherein during the second or fourth predetermined time, the members can rewind, fast forward, skip messages, or pause the playing of messages.

5. The method of claim 1, wherein one or more group members have authentication and voice messaging system rights that allow them to listen to messages on the voice messaging system and leave messages on the voice messaging system for the facilitator or the entire group.

6. The method of claim 1, wherein none, one, or more group members have authentication and voice messaging system rights that allow them to only listen to messages on the voice messaging system.

7. A method for conducting a non-real time telephonic group interaction comprising:

a. a group of a facilitator and a plurality of members;
b. a voice messaging system with a communal voice mail account and personal voice mail accounts for each individual member, wherein only the facilitator can listen to messages on the communal voice mail account, and members can only listen to messages on their personal voice mail account;
c. a first interaction phase wherein at a first predetermined time the facilitator provides a first voice message forwarded to each personal voice mail account;
d. a second interaction phase, wherein at a second predetermined time the members access their personal voice mail account and listen to the first voice message, and the members can optionally respond to the first voice message by leaving a responsive voice message directed to the group on the communal voice mail account;
e. a feedback loop interaction phase, wherein
   i. at a third predetermined time, the facilitator accesses the communal voice mail account and listens to all responsive voice messages, and forwards each responsive voice message to each personal voice mail account, and wherein the facilitator provides-a third phase voice message which is forwarded to each personal voice mail account; and
   ii. at a fourth predetermined time, each group member accesses their personal voice mail account and listens to the set of messages forwarded by the facilitator at the third predetermined time; and
   iii. the facilitator and members optionally repeat the feedback loop interaction phase, wherein the members access the communal voice mail box and leave a new responsive voice message, and wherein the facilitator and members repeat the events at the third and fourth predetermined times; and
f. a termination phase, wherein at a predetermined time; the group interaction ends.

8. The method of claim 7, wherein the feedback loop phase is repeated one or more times.

9. The method of claim 1, further comprising a plurality of two or more facilitators.

10. The method of claim 1, wherein during the termination phase, the facilitator summarizes the contents of the voice messages of the facilitator and group members provided during the feedback loop interaction phase, by providing a summary voice message for the group, and at a predetermined time the group members listen to the summary voice message prior to the end of the group interaction.

11. The method of claim 7, wherein during the termination phase, at a fifth predetermined time, the facilitator creates a fifth phase voice message forwarded to each personal voice mail account, and at a sixth predetermined time the group members listen to the fifth phase voice message, and at a seventh predetermined time, the group interaction ends.

12. The method of claim 1, wherein each predetermined time spans a time frame of one hour to one week.

13. The method of claim 7, wherein each predetermined time spans a time frame of one hour to one week.

14. The method of claim 1, wherein the size of the group does not exceed 20 members.

15. The method of claim 1, wherein the size of the group does not exceed 10 members.

16. The method of claim 7, wherein the size of the group does not exceed 20 members.

17. The method of claim 7, wherein the size of the group does not exceed 10 members.

* * * * *